(12) United States Patent
Hill et al.

(10) Patent No.: US 11,709,085 B2
(45) Date of Patent: Jul. 25, 2023

(54) METHOD FOR DETERMINING A DWELL VOLUME OF A CHROMATOGRAPHIC SYSTEM

(71) Applicant: Waters Technologies Corporation, Milford, MA (US)

(72) Inventors: Jason F. Hill, Milford, MA (US); Martin Gilar, Franklin, MA (US); Abhijit Tarafder, Blackstone, MA (US); Christopher DesJardins, Chelmsford, MA (US)

(73) Assignee: Waters Technologies Corporation, Milford, MA (US)

( * ) Notice: Subject to any disclaimer, the term of this patent is extended or adjusted under 35 U.S.C. 154(b) by 304 days.

(21) Appl. No.: 16/996,992

(22) Filed: Aug. 19, 2020

(65) Prior Publication Data

US 2021/0055149 A1 Feb. 25, 2021

Related U.S. Application Data

(60) Provisional application No. 62/889,820, filed on Aug. 21, 2019.

(51) Int. Cl.
*G01F 22/02* (2006.01)
*G01N 30/06* (2006.01)
(Continued)

(52) U.S. Cl.
CPC ............ *G01F 22/02* (2013.01); *G01N 30/06* (2013.01); *G01N 30/16* (2013.01); *G01N 2030/027* (2013.01)

(58) Field of Classification Search
CPC ........ G01F 22/02; G01N 30/06; G01N 30/16; G01N 2030/027
(Continued)

(56) References Cited

U.S. PATENT DOCUMENTS

2009/0205409 A1* 8/2009 Ciavarini ............. G05D 11/132
73/61.56

FOREIGN PATENT DOCUMENTS

DE 19902697 A1 7/2000

OTHER PUBLICATIONS

International Search Report and Written Opinion in PCT/US2020/046884 dated Nov. 13, 2020.
(Continued)

*Primary Examiner* — John Fitzgerald
*Assistant Examiner* — Rodney T Frank
(74) *Attorney, Agent, or Firm* — Schmeiser, Olsen & Watts LLP; William G. Guerin

(57) ABSTRACT

Described is a method for determining a dwell volume of a liquid chromatography system and a liquid chromatography system that can determined the system dwell volume. The method includes mixing a flow of a first solvent with a flow of a second solvent to form a solvent mixture. The flows of the first and second solvents are decreased and increased, respectively, to generate a gradient composition. A system pressure of the liquid chromatography system is measured to determine a pressure trace defined as the measured system pressure as a function of time. The dwell volume of the system is determined from a time delay determined between the gradient composition at the mixing location and the pressure trace. The method can be performed with a liquid chromatography system having a chromatographic column or a flow restrictor used in place of the chromatographic column.

18 Claims, 9 Drawing Sheets

(51) Int. Cl.
  *G01N 30/16* (2006.01)
  *G01N 30/02* (2006.01)
(58) Field of Classification Search
  USPC .......................................................... 73/61.55
  See application file for complete search history.

(56) References Cited

OTHER PUBLICATIONS

Jandera, et al. "Retention times and bandwidths in reversed-phase gradient liquid chromatography of peptides anti proteins," Jun. 23, 2011, Journal of Chromatography A, 1218, pp. 8874-8889.
Sharma, Sonika "Hand-portable Capillary Liquid Chromatography Instrumentation," Dec. 1, 2015, BYU Scholars Archive, No. 6164. https://scholarsarchive.byu.edu/etd/6164.
International Preliminary Report on Patentability in PCT/US2020/046884 dated Mar. 3, 2022.

* cited by examiner

METHOD FOR DETERMINING A DWELL VOLUME OF A CHROMATOGRAPHIC SYSTEM

RELATED APPLICATION

This application claims the benefit of the earlier filing date of U.S. Provisional Patent Application Ser. No. 62/889,820 filed Aug. 21, 2019 and titled "Method for Determining a Dwell Volume of a Chromatographic System," the entirety of which is incorporated herein by reference.

FIELD OF THE INVENTION

The technology generally relates to chromatography systems. More particularly, the technology relates to a method of determining a dwell volume of a liquid chromatography system based on a system pressure response to a composition gradient.

BACKGROUND

The dwell volume of a chromatographic system is generally defined as the volume of the flow path extending between the location where the solvents are mixed, i.e., where the solvent gradient is formed, and the inlet (head) of the chromatographic column. Prior to the beginning of the gradient arriving at the column inlet, the solvent flow at the inlet is isocratic. The gradient delay is the time difference between the time of initiation of the solvent gradient at the mixing location and the time when the solvent gradient first reaches the column inlet. The gradient delay can be determined from knowledge of the dwell volume and the solvent flow rate.

The dwell volume affects the throughput of a gradient separation and impacts the transfer of a gradient method from one chromatographic system to another. Differences in the dwell volume between systems can lead to differences in the solvent gradient at the column. Consequently, problems can arise when transferring a method between different chromatographic systems, especially when the dwell volume is different between the systems and cannot be compensated because the difference is unknown. For example, the transferred method may result in a change in the selectivity and spacing of the peaks in the chromatogram. For longer gradient delays, i.e., larger dwell volumes, isocratic separation can occur for a significant time before the gradient arrives at the column. Thus, isocratic separation can be significant and may result in substantially different chromatograms when compared to systems having small dwell volumes.

One conventional technique for determining the dwell volume of a liquid chromatography system is based on measuring the dwell volume using two sources of the same solvent. The solvent supplied by one of the sources includes an additional compound that is easily sensed by the chromatography detector. For example, for a system employing an ultraviolet (UV) light detector, a UV tracer compound may be added to the solvent at one of the solvent sources. A solvent gradient is generated by mixing the solvents supplied from the two sources. Thus, a user is required to spend time to prepare the solvents and install the solvent sources. In addition, a process of cleansing the flow path of the liquid chromatography system may be required after the dwell volume measurement to prevent contamination of the system with a foreign compound and degradation of system performance. A further problem may be encountered if certain system components are modified. For example, changes to tubing and/or mixers can result in a change in the dwell volume therefore an earlier determination of the dwell volume may no longer be accurate and the dwell volume may need to be re-measured.

SUMMARY

Examples of the present disclosure include a method for determining a dwell volume of a liquid chromatography system and a liquid chromatography system that can determine its own dwell volume.

In one example, a method for determining a dwell volume of a liquid chromatography system includes mixing a flow of a first solvent and a flow of a second solvent at a mixing location to generate a solvent mixture in a system flow of a liquid chromatography system. During a gradient duration, the flow of the first solvent is decreased and the flow of a second solvent is increased to generate a gradient composition for the solvent mixture. A system pressured of the liquid chromatography system is measured to determine a pressure trace defined as the measured system pressure as a function of time. A dwell volume of the liquid chromatography system is determined from a time delay determined between the gradient composition at the mixing location and the pressure trace.

The solvent mixture may have a viscosity that changes in response to the gradient composition. The change in viscosity may be substantially linearly proportional to a change in the solvent mixture according to the gradient composition.

A viscosity of the first solvent may be different than a viscosity of the second solvent.

The gradient composition may be a linear gradient composition or a step gradient. The gradient composition may be a nonlinear gradient composition determined to provide a substantially linear pressure change for at least a portion of the pressure trace responsive to the gradient composition.

The liquid chromatography system may include a chromatographic column and the determination of the dwell volume may include determining a product of the time delay and a flow rate of the solvent mixture, and subtracting half of a volume of the chromatographic column from the product.

The liquid chromatography system may include a flow restrictor configured to provide a system pressure drop for the system flow and the determining of the dwell volume may include determining a product of the time delay and a flow rate of the solvent mixture.

In another example, a computer program product for determining a dwell volume of a liquid chromatography system includes a computer readable storage medium having computer readable program code embodied therewith. The computer readable program code includes:

computer readable program code configured to mix a first solvent and a second solvent at a mixing location to generate a solvent mixture in a system flow of a liquid chromatography system;

computer readable program code configured to decrease the flow of the first solvent and increase the flow of the second solvent over a gradient duration to generate a gradient composition for the solvent mixture;

computer readable program code configured to measure a system pressure and determine a pressure trace therefrom, the pressure trace defined as the measured system pressure as a function of time; and computer readable program code configured to determine a dwell volume of the liquid chromatography system from a time delay between the gradient composition at the mixing location and the pressure trace.

The liquid chromatography system may include a chromatographic column and the computer readable program code configured to determine a dwell volume include computer readable program code configured to determine a product of the time delay and a flow rate of the solvent mixture, and computer readable program code configured to subtract half of a volume of the chromatographic column from the product.

In another example, a liquid chromatography system includes a source of a first solvent, a source of a second solvent, a pump, a flow restrictor, a pressure sensor and a processor. The mixer has a mixer inlet to receive the first and second solvents and a mixer outlet to provide a solvent mixture. The pump has a pump inlet in fluidic communication with the mixer outlet and has a pump outlet. The pump receives the solvent mixture at the pump inlet and provides the solvent mixture at a system pressure in a system flow dispensed from the pump outlet. The flow restrictor has a restrictor inlet in fluidic communication with the pump outlet and has a restrictor outlet. The pressure sensor is disposed in a system flow after the pump outlet and generates a pressure signal indicating a measured system pressure. The processor is in communication with the sources of the first and second solvents and with the pressure sensor. The processor is configured to generate a gradient composition in the system flow by controlling a contribution of the first solvent and a contribution of the second solvent to the mixer and to determine a pressure trace from the pressure signal. The pressure trace is defined as the measured system pressure as a function of time. The processor is further configured to determine a time delay between the gradient composition at the mixing location and the pressure trace and to determine a dwell volume of the liquid chromatography system from the time delay.

The liquid chromatography system may further include a gradient proportioning valve disposed between the mixer and the sources of the first and second solvents.

The processor may determine the dwell volume as a product of the time delay and a flow rate of the solvent mixture.

The flow restrictor may be a chromatographic column and the determining of the dwell volume include determining a product of the time delay and a flow rate of the solvent mixture and subtracting half of a volume of the chromatographic column from the product.

In another example, a liquid chromatography system includes a source of a first solvent, a source of a second solvent, a first pump, a second pump, a mixer, a flow restrictor, a pressure sensor and a processor. The first pump has a first pump inlet in fluidic communication with the source of the first solvent and has a first pump outlet. The second pump has a second pump inlet in fluidic communication with the source of the second solvent and has a second pump outlet. The mixer has a first mixer inlet and a second mixer inlet in fluidic communication with the first pump outlet and the second pump outlet, respectively, and a mixer outlet to provide a solvent mixture. The flow restrictor has a restrictor inlet in fluidic communication with the pump outlet and has a restrictor outlet. The pressure sensor is disposed in a system flow after the mixer outlet and generates a pressure signal indicating a measured system pressure. The processor is in communication with the first and second pumps and the pressure sensor. The processor is configured to generate a gradient composition in the system flow by controlling a contribution of the first solvent and a contribution of the second solvent to the mixer and to determine a pressure trace from the pressure signal. The pressure trace is defined as the measured system pressure as a function of time. The processor is further configured to determine a time delay between the gradient composition at the mixing location and the pressure trace and to determine a dwell volume of the liquid chromatography system from the time delay.

The processor may determine the dwell volume as a product of the time delay and a flow rate of the solvent mixture.

The flow restrictor may be a chromatographic column and the determination of the dwell volume may include determining a product of the time delay and a flow rate of the solvent mixture and subtracting half of a volume of the chromatographic column from the product.

BRIEF DESCRIPTION OF THE DRAWINGS

The above and further advantages of this invention may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the invention.

DETAILED DESCRIPTION

Reference in the specification to an "example" or "implementation" means that a particular feature, structure or characteristic described in connection with the example or implementation is included in at least one example or implementation of the teaching. References to a particular example or implementation within the specification do not necessarily all refer to the same example or implementation.

The present teaching will now be described in more detail with reference to examples and implementations shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

In brief overview, examples of a method for determining a dwell volume of a liquid chromatography system are disclosed below. The method includes the mixing of solvents to generate a gradient mobile phase. The system pressure of the liquid chromatography system is measured over time to determine a "pressure trace." The pressure trace is compared to a gradient composition at the location of mixing of the solvents as a function of time to determine a time delay. This time delay then allows the dwell volume to be calculated based on the flow rate of the solvent mixture. Advantageously, a UV tracer or other additional compound is not required. Thus, preparation time for the dwell volume measurement is reduced and the risk of contamination by an additional compound is avoided. Additionally, the liquid chromatography system requires no physical reconfiguration. For example, the method can be performed without the need to remove the chromatographic column and replumb the flow path with additional tubing. Further, the reduction in operator actions used to perform the measurement reduces the possibility of human error that could lead to an erroneous dwell volume determination. In addition, the time required to perform the method and the resulting accuracy can reduce the problems that may arise when transferring a method between different chromatography systems and configurations.

Figure 1:
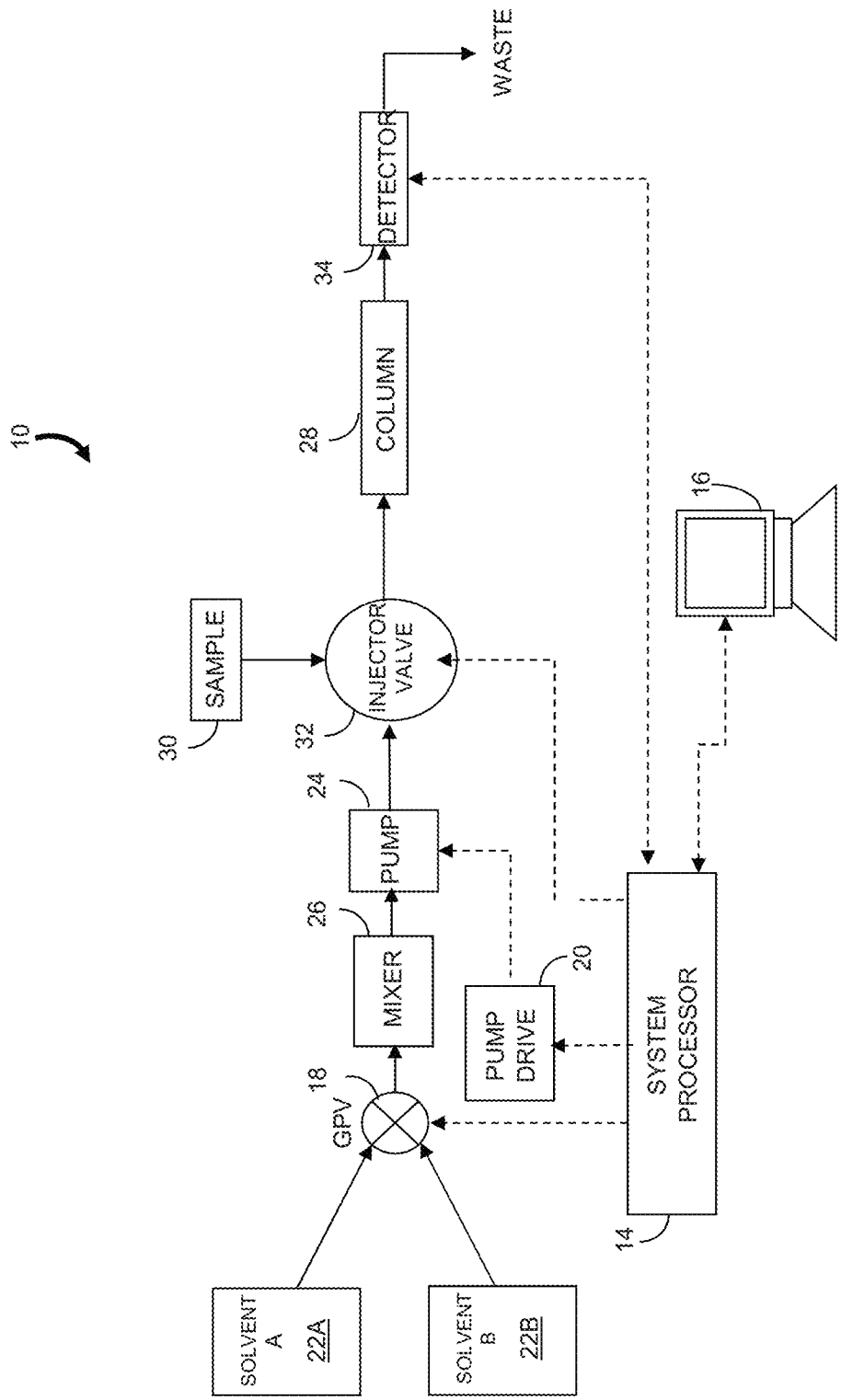
FIG. 1 is a block diagram of an example of a liquid chromatography system that can be used to run a gradient separation.

FIG. 1 is a block diagram of a liquid chromatography system 10 that includes a system processor 14 (e.g., microprocessor and controller) in communication with a user interface device 16 for receiving input parameters and displaying system information to an operator. The system processor 14 communicates with a gradient proportioning valve (GPV) 18 which is used to control contributions of two solvents A and B contained in solvent sources (e.g., reservoirs) 22A and 22B, respectively, to a solvent flow. The system processor 14 is also in communication with a pump drive module 20 which controls a system pump 24 and an injection valve 32 used to inject a sample into the solvent flow. A mixer 26 receives the solvent flow from the GPV 18 at a mixer inlet. The received solvent flow comprises alternating contributions of each solvent. The mixer 26 homogenizes the composition of the solvent flow and provides a solvent mixture at a mixer outlet. The solvent mixture flows to a pump inlet of the system pump 24 where the solvent mixture is pressurized to a system pressure. The pump 24 can include pump heads that may be configured in a variety of ways. For example, the pump 24 can include a primary pump head in serial communication with an accumulator pump head.

During a separation run, a sample from a sample reservoir, or sample container, 30 is injected by the injector valve 32 into the mobile phase flowing to a chromatographic column 28. The column 28 is coupled to a detector 34 which provides a detector signal to the system processor 14. The detector signal is responsive to components in the sample that elute from the column 28.

During operation of the liquid chromatography system 10 with the gradient mobile phase, solvents A and B are drawn from the solvent sources 22. The relative contributions of the solvents present in the mixed mobile phase depends on the discrete contributions of each solvent provided by the GPV 18. These contributions change over time during the gradient formation according to a desired (predetermined) gradient composition for the mobile phase.

In one conventional technique used to determine the dwell volume of the system 10, the solvent sources 22A and 22B hold solvent A and solvent B, respectively. In some implementations, the solvents A and B are identical. A small amount of an organic compound that absorbs ultraviolet (UV) light (i.e., a UV tracer) is added to the solvent in solvent source 22B. Subsequently, the system 10 performs a gradient separation run wherein the gradient comprises 100% of the solvent A from solvent source 22A and transitions over a gradient transition time to a solvent comprising 100% of the solvent B from solvent source 22B that includes the UV tracer. Subsequently, the gradient flowing through the system is held at the 100% solvent B before the solvent flow returns to 100% of solvent A. As described in more detail below, the chromatographic column is removed to implement this technique. Removal of the column is done because the column adds volume and can cause complications due to potential retention of the UV active analyte.

Figure 2:
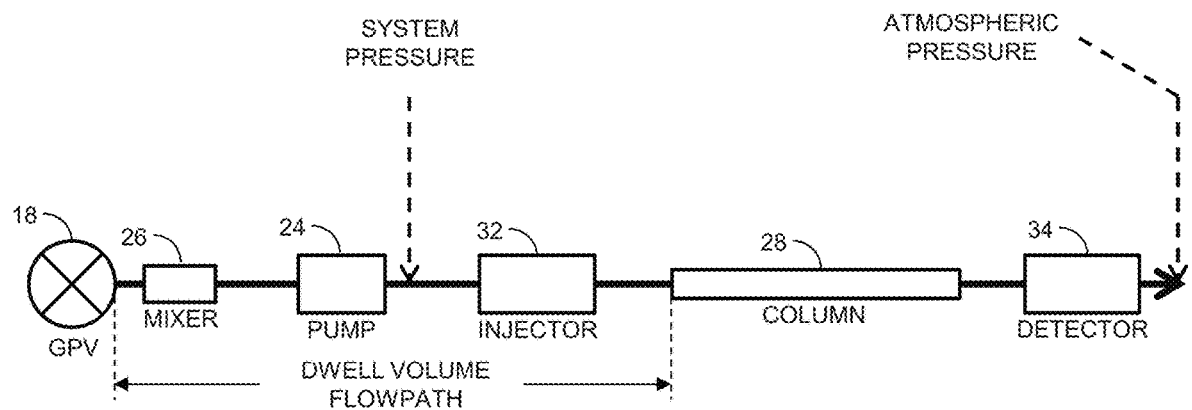
FIG. 2 is a schematic block diagram depicting how a solvent mixture progresses through the liquid chromatography system of FIG. 1 from the gradient proportioning valve through the detector.

FIG. 2 is a schematic block diagram depicting how a solvent mixture progresses through the liquid chromatography system from the GPV 18 and through the detector 34. The system pressure is highest at the outlet of the pump 24. Most of the pressure drop in the liquid chromatography system occurs across the chromatographic column 28. There is a delay time $\Delta t$ for the gradient composition as first defined at the GPV 18 to be realized at the inlet of the column 28. This delay time $\Delta t$ is defined as the difference in time between the time when the gradient first arrives at the inlet of the column 28 and the time when the gradient first starts (i.e., isocratic flow ceased) at the GPV 18.

Figure 3:
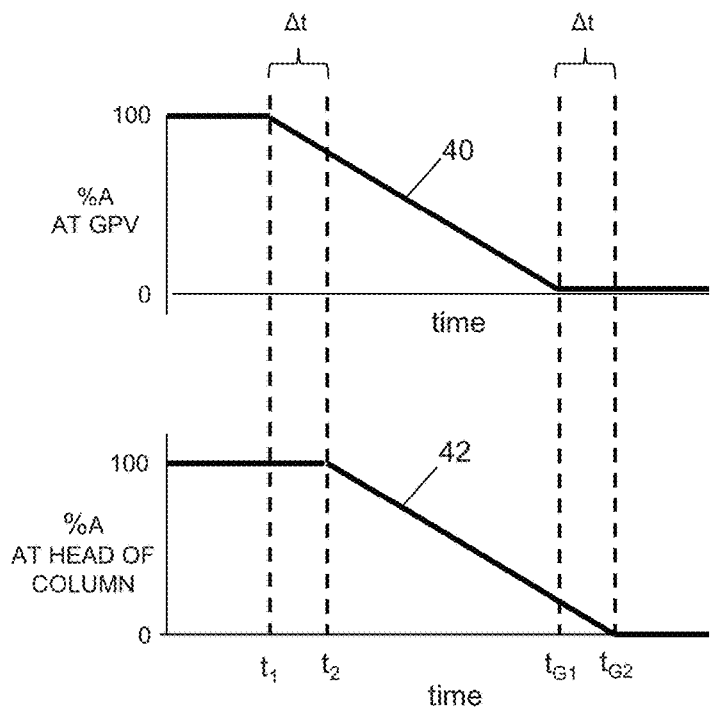
FIG. 3 is a graphical depiction of a technique of using an ultraviolet tracer solvent to determine the dwell time and dwell volume of a liquid chromatography system.

Referring also to FIG. 3, a graphical depiction of the above-described technique of using the UV tracer solvent to determine the dwell time and dwell volume is shown. The figure includes a plot 40 that depicts the percentage of solvent A in the system flow at the GPV 18 as a function of time. The figure also includes a plot 42 that depicts the percentage of solvent A at the head of the column 28 as a function of time.

The liquid chromatography system runs in an isocratic mode with a 100% contribution of solvent A to the system flow. Subsequently, there is a time $t_1$ when the gradient is first formed at the GPV 18 when the contribution of solvent A first starts to decrease. Due to the propagation time for the liquid to traverse the dwell volume defined between the mixing location (i.e., gradient formation location) and the column inlet, the time $t_2$ when the gradient first reaches the head of the column 28 is delayed from the time the gradient was initiated at the GPV 18 by a time $\Delta t = t_2 - t_1$. The gradient end time $t_{G1}$ corresponds to when the solvent at the GPV 18 is entirely composed of solvent B. Similarly, the time $t_{G2}$ when the end of the gradient first reaches the head of the column 28 is delayed from the time when the end of the gradient occurred at the GPV 18 by the same time $\Delta t$.

Generally, the gradient composition at the head of the column 28 is approximately the same gradient composition defined at the GPV 18 but delayed by the time $\Delta t$ (without the column in the flow path). Thus, plot 42 is similar to plot 40 other than the horizontal offset due to the time delay $\Delta t$.

The above conventional technique for determining dwell volume imposes demands on the system operator. The operator has to prepare solvent A, prepare solvent B with a desired UV tracer and run the separation. A determination of the time offset (i.e., the separation of the two plots 40 and 42) is made for a magnitude on each of the plots 40 and 42 that is midway (i.e., 50% level) between the maximum and minimum values. The determined time offset $\Delta t$ is multiplied by the flow rate of the system flow to determine the dwell volume. Once the measurements are completed, the system is typically flushed to ensure that no UV tracer remains in the system before pre-priming the system for normal operations. This technique generally requires several hours or more, depending on the expertise of the operator performing the measurements. Moreover, the technique can be subject to operator errors. For example, an excessive amount of the UV tracer can result in a non-linear response of the UV detector, leading to inaccuracies.

To perform the above measurements, the operator removes the chromatographic column 28 and replaces that portion of the system flow path with tubing having a small inner diameter. This change is performed because the volume of the chromatographic column 28 represents a significant portion of the overall system flow path and therefore measurements by the UV detector of the gradient delay would not represent the delay incurred at the head of the column 28. In contrast, the volume of the replacement tubing adds only a small overall volume (e.g., a few microliters or less) to the system flow path. Thus, this additional tubing volume is sufficiently small so that its contribution to the measured gradient delay time is generally negligible. However, the need to remove the chromatographic column and replumb the flow path with the additional tubing represents an additional time burden when using the conventional UV tracer technique.

Although a user could leave the chromatographic column 28 in place in the system if accurate knowledge of the column volume is available, careful attention is required to ensure that the UV tracer is not retained on the column 28 and thereby cause an incorrect measurement. A secondary concern is that any retained UV tracer may result in contamination of a later separation run.

Described below are examples of using a system pressure response, i.e., the system pressure as a function of time, also referred to herein as a "pressure trace," to determine the dwell time of a liquid chromatographic system. This system pressure trace can be measured by a pressure sensor disposed in the flow path upstream from the main system pressure drop caused by the chromatographic column (or a restrictor if no column is present). For example, the system pressure trace can be determined from a pressure signal generated by the pressure sensor that indicates the system pressure as a function of time. In some implementations, the pressure sensor is a pressure transducer located at the outlet of the pump. The pressure drop across the tubing (or column, if present) is directly proportional to the dynamic viscosity (Poiseuille's law). Under certain conditions, the pressure trace has a slope that is proportional to the slope of a linear binary phase gradient. To achieve this condition, the viscosity change of the solvent mixture with respect to the change in solvent composition is substantially linear. Stated otherwise, the viscosity change of the solvent mixture is substantially linearly proportional to the change in a solvent contributing to the total solvent flow over a limited range of solvent composition. For example, for a linear decrease in a solvent contribution of a solvent (e.g., solvent A) can result in a linear decrease in the system pressure; however, this linearity generally does not exist across a full transition from 100% to 0% of solvent A over the gradient duration.

Figure 4:
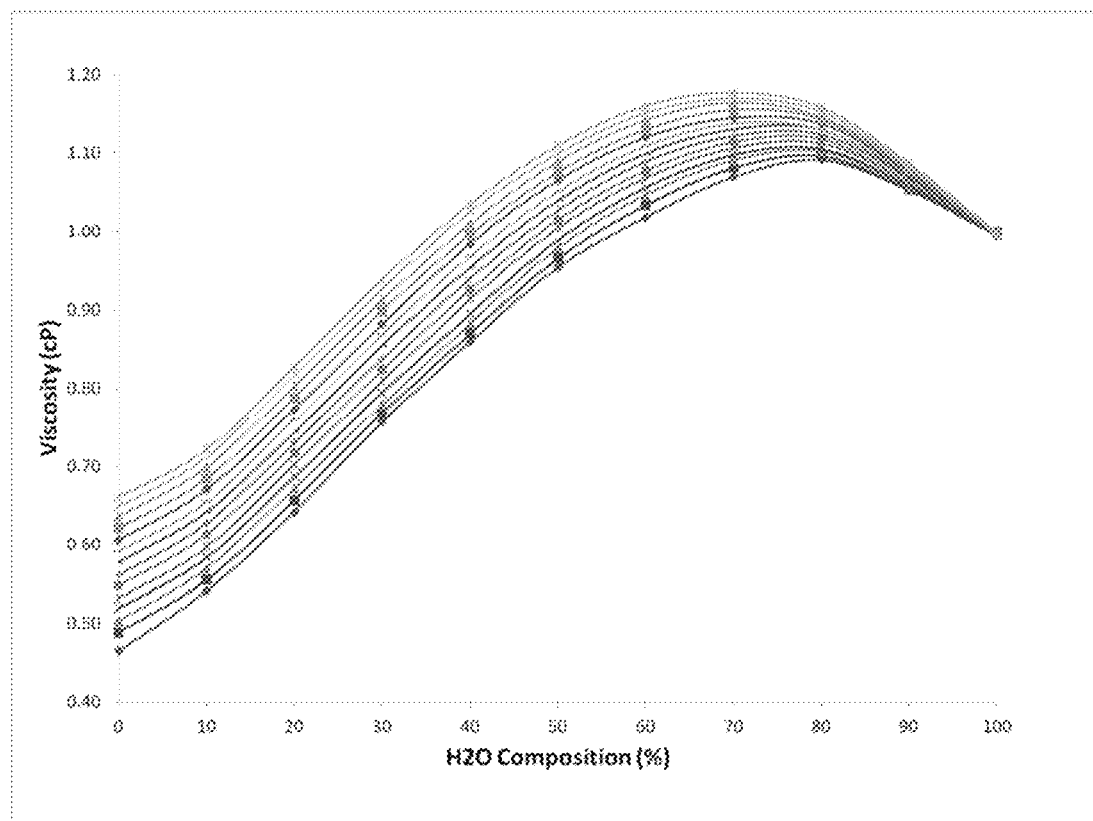
FIG. 4 is a graphical representation of the dependence of viscosity as a function of water content in an aqueous and acetonitrile mixture.

The viscosity of a solvent mixture typically changes as a function of a percentage of a particular solvent in a solvent mixture. For example, FIG. 4 graphically depicts the dependence of viscosity as a function of water present in an aqueous and acetonitrile mixture and FIG. 5 graphically depicts the dependence of viscosity as a function of water present in an aqueous and methanol mixture. Each plot indicates the viscosity at a different temperature with higher temperature plots corresponding to lower viscosities. In FIG. 4, the viscosity changes in an approximately linear way for water composition between about 10% and about 40% and, in FIG. 5, the viscosity changes in an approximately linear way for water composition between about 0% and about 20% and between about 70% and about 100%.

With knowledge of the linear range of viscosity in a solvent mixture, an operator can program (define) a gradient composition to achieve a gradient change in time that remains in the linear viscosity range. For example, an operator may program a gradient for an acetonitrile and water mixture that spans one of the linear ranges over a few minutes.

As described above, the conventional UV tracer technique for determining gradient delay typically involves removal of the chromatographic column and replacement with tubing having a small inner diameter. This change is performed because the volume of the chromatographic column represents a significant portion of the overall system flow path and therefore measurements by the UV detector of the gradient delay would not represent the delay at the head of the column. In contrast, the volume of the replacement tubing adds only a small overall volume (e.g., a few microliters or less) to the system flow path. Thus, this additional tubing volume is sufficiently small so that its contribution to the measured gradient delay time is generally negligible. However, the need to remove the chromatographic column and replumb the flow path with the additional tubing represents an additional time burden when using the conventional UV tracer technique.

In the various examples of a method for determining a dwell volume described herein, most of the pressure drop across the liquid chromatography system occurs across the chromatographic column. The presence of the column is beneficial because the pressure drop across the column ensures that the resulting pressure trace does not include a significant pressure noise component and the need to install replacement tubing is avoided. Another advantage of the method is that standard mobile phase solvents, such as aqueous, acetonitrile and/or methanol, can be used without the need to utilize special solvents (e.g., solvent with a UV tracer) and incur any contamination risk.

Figure 6:
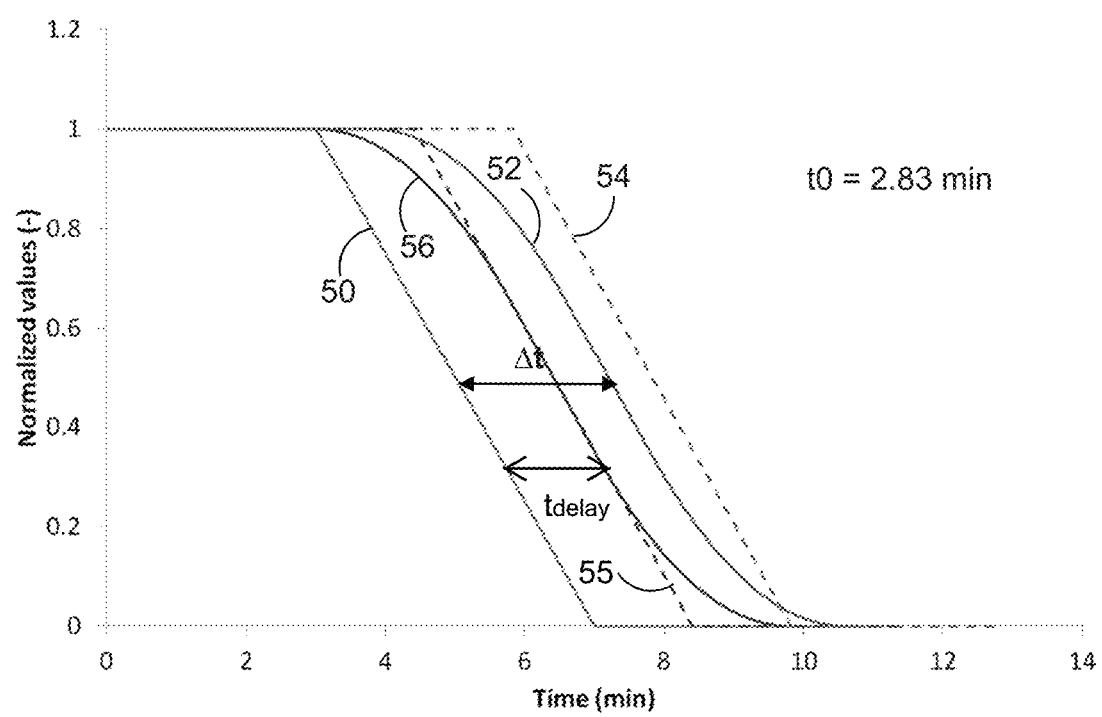
FIG. 6 is a graphical depiction of a programmed gradient and a resulting pressure trace for a liquid chromatography system used to perform a method for determining a dwell volume of the liquid chromatography system.

FIG. 6 is a simplified graphical depiction of a programmed gradient 50 and a resulting pressure trace 52 for a liquid chromatography system. Also shown is a plot 54 of the programmed gradient shifted to a later time corresponding to the outlet of a chromatography column based on the column volume. Plot 55 is similar to plot 54 except that plot 55 represents the programmed gradient at the same position without a column in the system. Thus, from plots 54 and 55, it can be seen that half of the time difference between plots 54 and 55 (corresponding to half of the column volume) can be subtracted from the difference Δt between of the measured pressure trace 52 and the programmed gradient 50 to determine the gradient delay $t_{delay}$.

More specifically, with respect to the illustrated example, the programmed gradient 50 shows a transition over four minutes from a maximum of the first solvent (solvent A) to a minimum of the first solvent where the maximum and minimum values are selected to achieve a linear response in the pressure trace 52 as described above. The pressure trace 52 decreases from a maximum pressure value until it reaches a minimum pressure value. Some distortion from linearity in the pressure trace 52 is evident near the beginning and near the end of its transition due to effects from the mixer where the solvents are combined. The pressure trace 52 is shifted in time from the programmed gradient 50 by a time Δt due to the dwell volume and the column volume. To properly determine the gradient delay at the head of the chromatographic column, the time shift Δt between the programmed gradient 50 and the pressure trace 52 is decreased by a time corresponding to half of the column volume multiplied by the flow rate. For example, if the column has a delay time of to associated with its full volume and the flow rate, the gradient delay is $\Delta t - t_0/2$. The column volume may be known from product specification information. Alternatively, for some columns, the column volume may be calculated from other parameters for the column such as the column dimensions and particle size. Thus, the gradient delay at the head of the column can easily be determined from the measured value Δt and the known column volume to.

Figure 7A:
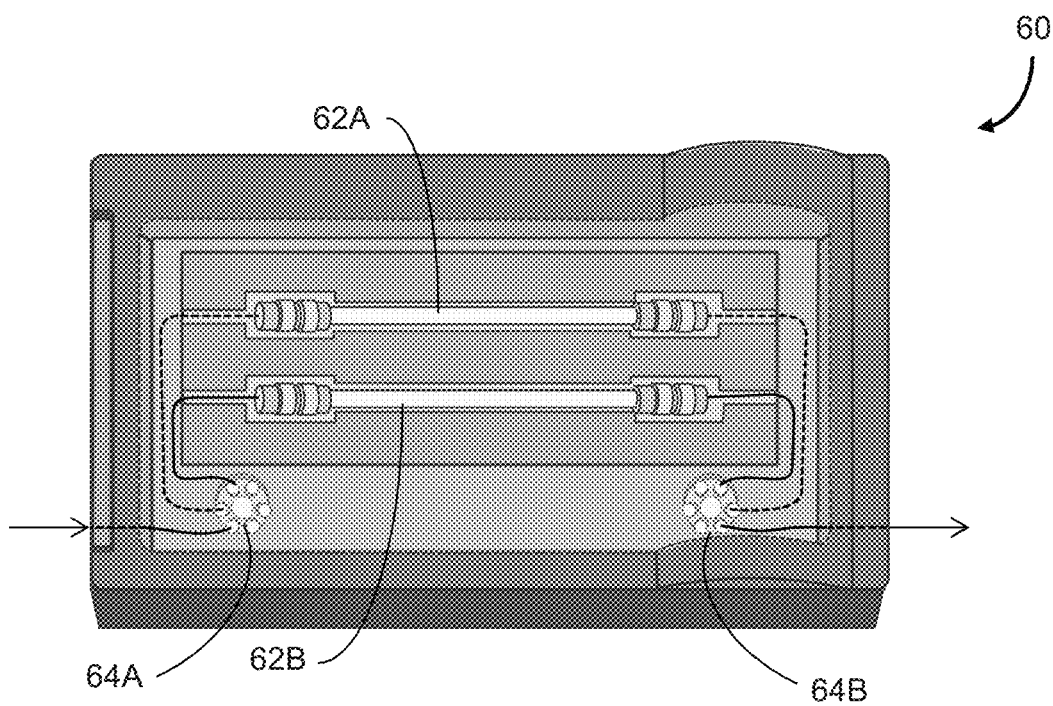
FIG. 7A shows a column manager having two chromatographic columns, one of which is selectable for inclusion in a system flow path.
Figure 7B:
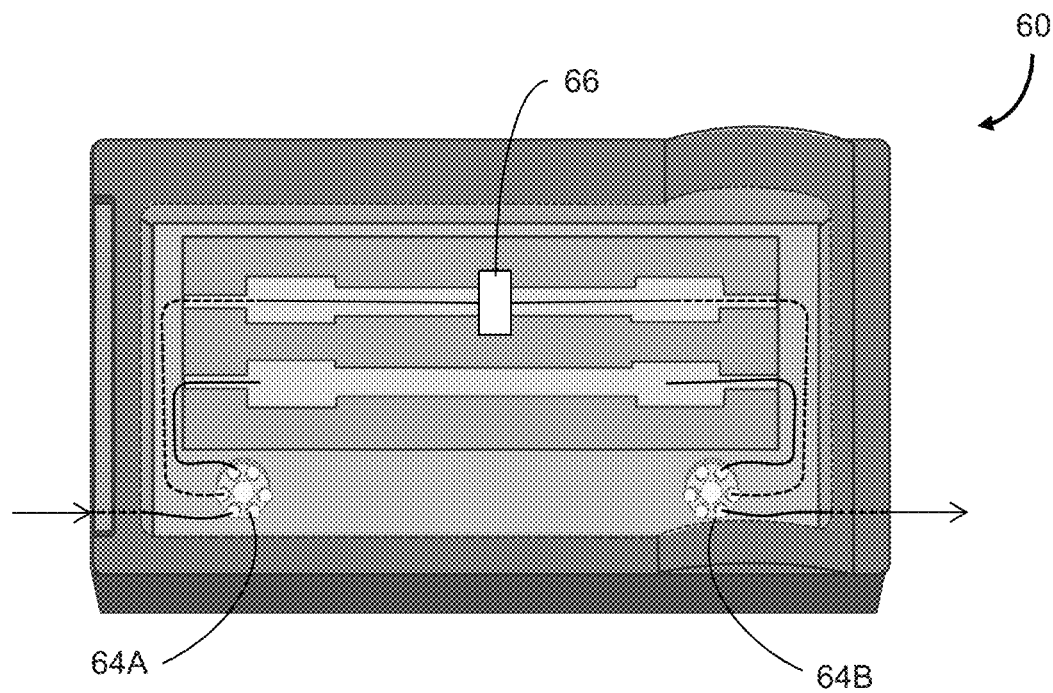
FIG. 7B shows the column manager of FIG. 7A occupied by a restrictor having a negligible volume with respect to a conventional liquid chromatography system.

FIG. 7A illustrates a column manager 60 having two chromatographic columns 62A and 62B. The particular column used for a separation can be selected by valves 64A and 64B. The determination of the dwell volume can be made using the flow path for either column 62. In an alternative configuration shown in FIG. 7B, the column manager 60 may include a restrictor 66 such as a length of tubing having a negligible volume compared to the dwell volume and which acts as the main pressure drop across the chromatography system. One advantage of this alternative configuration is that no knowledge of the column volume is necessary. The gradient delay time is determined directly as Δt without any need to subtract half of a column delay time to. In one non-limiting numerical example, the tubing has an inner diameter of 100 μm or less and the pressure drop across the tubing length is approximately 13.8 MPa (2,000 psi).

The method for determining a dwell volume of a liquid chromatography system was evaluated for three different configurations. The gradient was based on an aqueous mixture containing acetonitrile where the percentage of acetonitrile in the mixture was limited to between 60% to 90% (i.e., 40% to 10% water) so that the viscosity change was limited to a substantially linear region (see FIG. 4). A protocol for the method included achieving a change in the system pressure of approximately 6.9 MPa (1,000 psi) and limiting the maximum system pressure to 27.6 MPa (4,000 psi) or less according to a variable flow rate. The parameters according to the protocol were selected to reduce the effects of nonlinear variation of viscosity due to pressure and temperature changes, and to address solvent compressibility.

The programmed gradient was selected for each configuration as 60% acetonitrile and the change in acetonitrile to be in a range between 10% and 30%. The initial hold volume was selected to be approximately twice the column volume, the gradient duration was selected to be at least twice the column delay time and the final hold volume was selected to be approximately twice the column volume. The evaluations were performed at a temperature of approximately 30° C.

Figure 8:
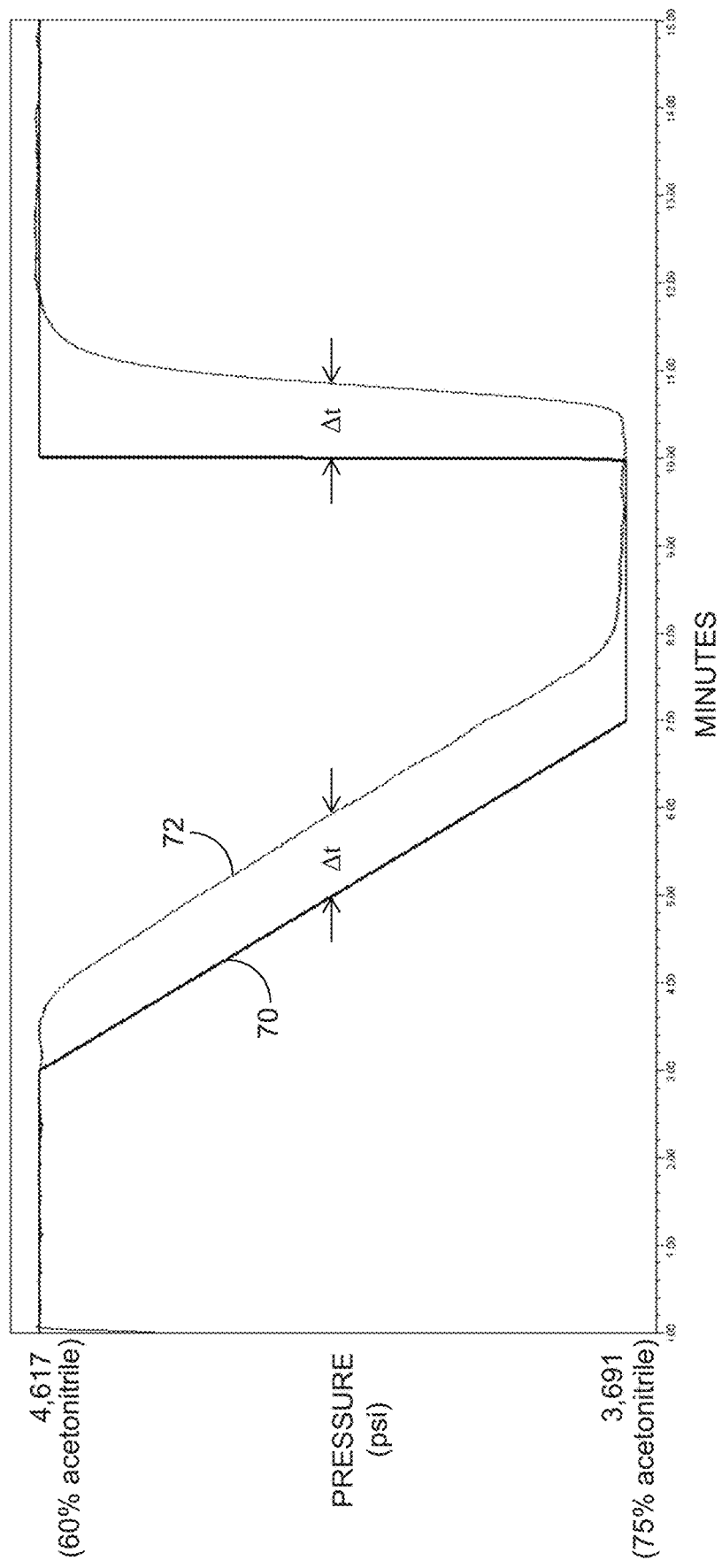
FIG. 8 is a graphical representation of a programmed gradient composition and resulting pressure trace for an example implementation of a method for determining a dwell volume of a liquid chromatography system.

FIG. 8 graphically depicts an example implementation of the method for determining a dwell volume of a liquid chromatography system. In this example, the chromatography system was an AQUITY® UPLC H-Class system available from Waters Corporation of Milford, Mass. The chromatographic column was a 2.1×75 mm column with a 2.5 μm particle size and having a column volume of 0.172 mL. The gradient was an aqueous solvent mixture at a flow rate of 0.5 mL/min that transitioned from 60% acetonitrile to 75% acetonitrile in four minutes. Plot 70 depicts the programmed gradient and plot 72 is the measured pressure trace having a maximum value of 31.83 MPa (4,617 psi) and a minimum value of 25.45 (3,691 psi).

The measured pressure trace 72 shows a Δt at the 50% (midrange) pressure value between the minimum and maximum pressures of 0.98 minute which, based on the flow rate of 0.5 mL/min, corresponds to a dwell volume of 0.49 mL. After subtracting 0.086 mL, which is one half of the column volume, the dwell volume to the head of the column is determined to be 0.404 mL. This is similar to the 0.384 mL volume determined by the UV tracer method described above.

After the expiration of the gradient at 7.0 minutes, the solvent composition was held constant until 10.0 minutes when the programmed gradient composition returned to 60% acetonitrile in a step change. It can be seen that a second Δt can be determined from the rise in the pressure trace 72. In this example, the second Δt is 0.90 minute. Thus, the method is in effect performed twice where, in the first case, the flow of water is decreased while the flow of acetonitrile increased and, in the second case, the flow of acetonitrile is decreased while the flow of water is increased. Stated otherwise, the flow of the second solvent is decreased while the flow of the first. The second value of Δt for the increasing pressure ramp should be similar to the first value obtained from the decreasing pressure ramp, and therefore serves as a check on the first value. Alternatively, the two values may be averaged for use in determining the dwell volume although it is generally preferable to use the Δt determined for a linear gradient as opposed to a step change in composition as the linear gradient technique is generally more accurate.

Figure 9:
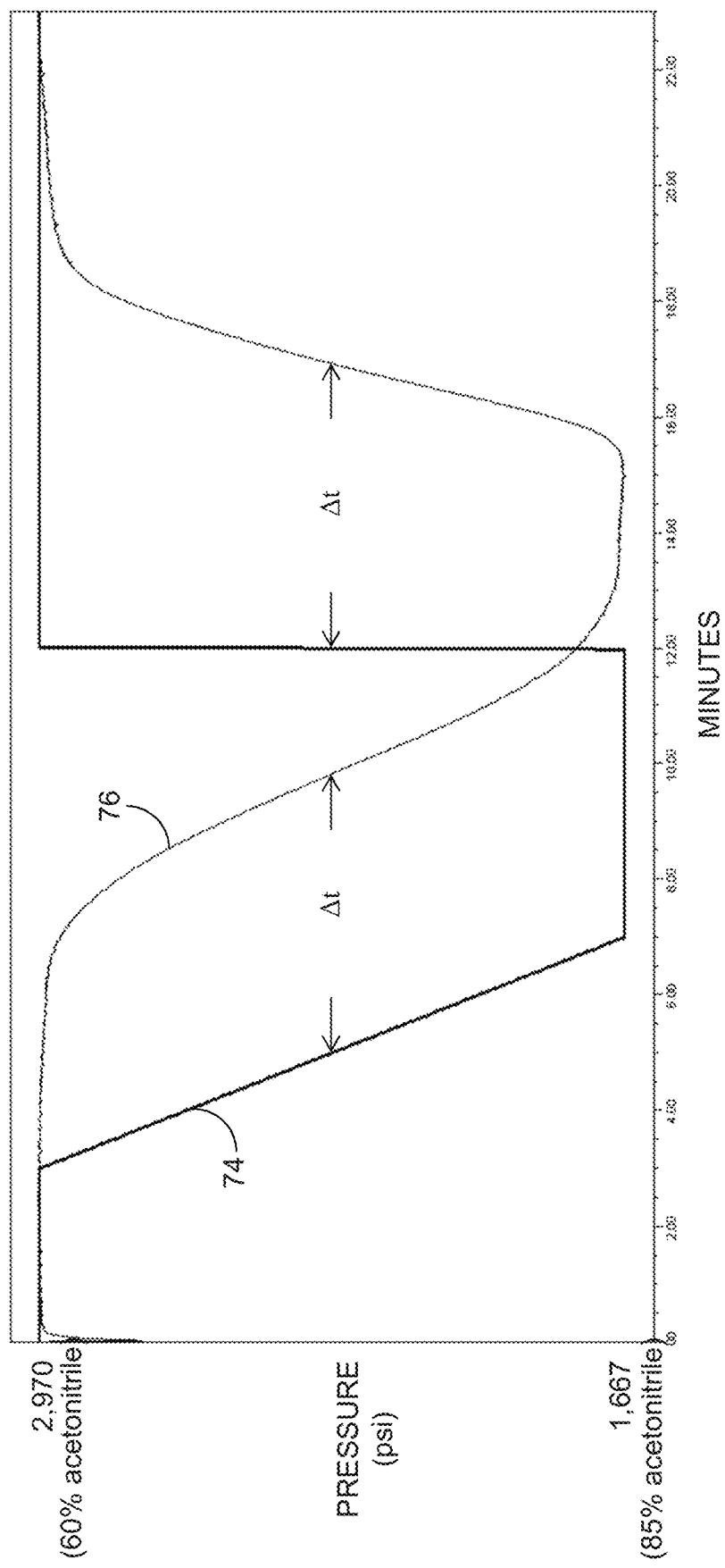
FIG. 9 is a graphical representation of a programmed gradient composition and resulting pressure trace for another example implementation of a method for determining a dwell volume of a liquid chromatography system.

FIG. 9 depicts another example implementation of the method. In this example, the chromatography system was an Alliance HPLC system and the chromatographic column was a 3.0×150 mm column having a 2.5 μm particle size and a column volume of 0.7 mL. The gradient was an aqueous solvent mixture at a flow rate of 0.3 mL/min that transitioned from 60% acetonitrile to 85% acetonitrile in four minutes. Plot 74 depicts the programmed gradient and plot 76 is the measured pressure trace having a maximum value of 20.48 MPa (2,970 psi) and a minimum value of 11.49 (1,667 psi).

The measured pressure trace 76 exhibits a Δt of 4.82 minutes at the midrange pressure value which, based on the flow rate of 0.3 mL/min, corresponds to a dwell volume of 1.446 mL. (The measured pressure trace 76 also provides a second Δt of 4.87 minutes based on the step change back to initial solvent composition.) After subtracting 0.35 mL, which is one half of the column volume, the dwell volume to the head of the column is determined to be 1.096 mL. This is similar to the 1.14 mL volume determined by the UV tracer method described above.

Figure 10:
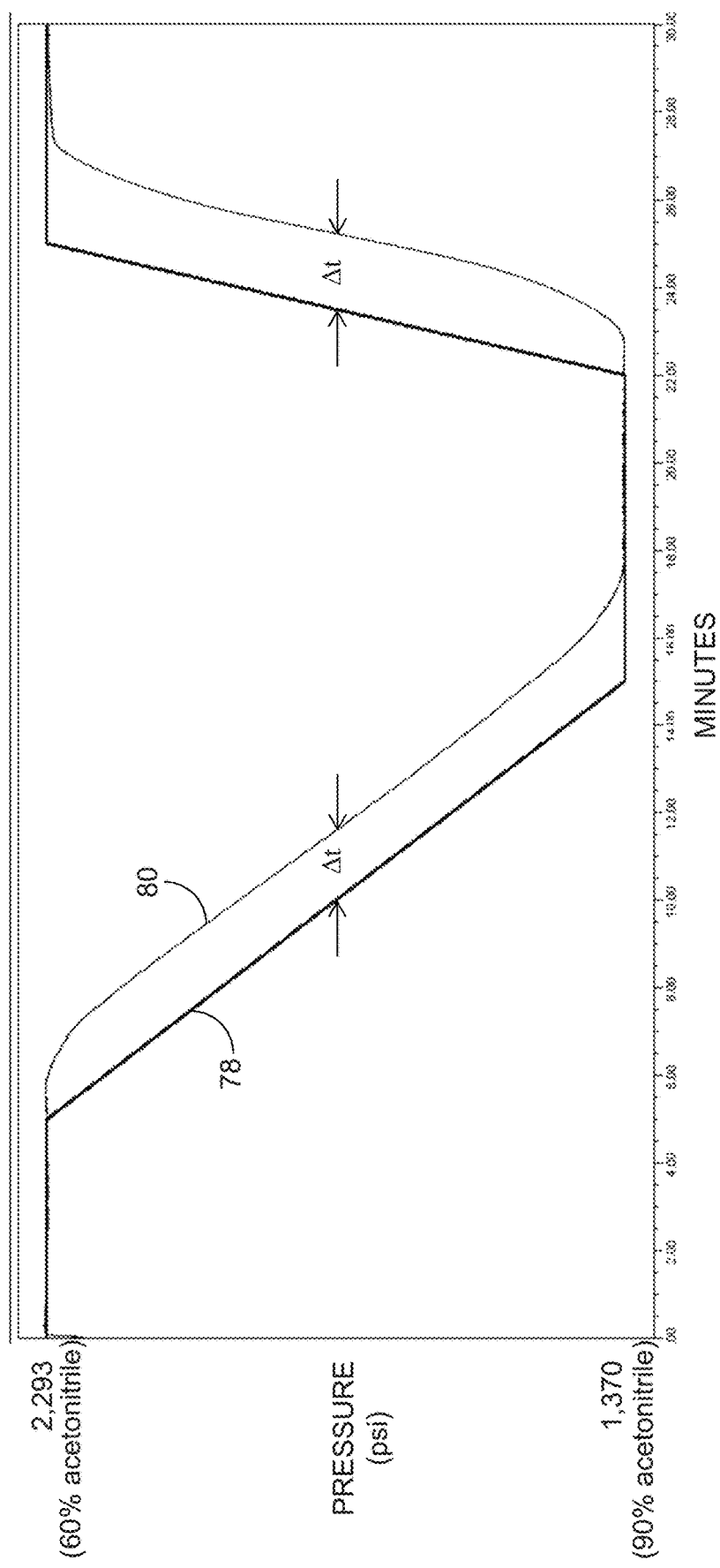
FIG. 10 is a graphical representation of a programmed gradient composition and resulting pressure trace for another example implementation of a method for determining a dwell volume of a liquid chromatography system.

FIG. 10 depicts another example implementation of the method. In this example, the chromatography system was an AQUITY® Arc system available from Waters Corporation of Milford, Mass. The chromatographic column was a 4.6×250 mm column having a 5 µm particle size and a column volume of 2.32 mL. The gradient was an aqueous solvent mixture at a flow rate of 1.0 mL/min that transitioned from 60% acetonitrile to 90% acetonitrile in ten minutes. Plot 78 depicts the programmed gradient and plot 80 is the measured pressure trace having a maximum value of 15.81 MPa (2,293 psi) and a minimum value of 9.45 MPa (1,370 psi).

The measured pressure trace 80 exhibits a first $\Delta t$ of 1.99 minutes at the midrange pressure value which, based on the flow rate of 1.0 mL/min, corresponds to a dwell volume of 1.99 mL. The second $\Delta t$ determined from the rise in the pressure trace 80 resulting from a reverse linear gradient starting at 22.0 minutes is also 1.99 minutes. After subtracting 1.16 mL, which is one half of the column volume, the dwell volume to the head of the column is determined to be 0.83 mL. This is similar to the 0.81 mL volume determined by the UV tracer method described above.

Figure 5:
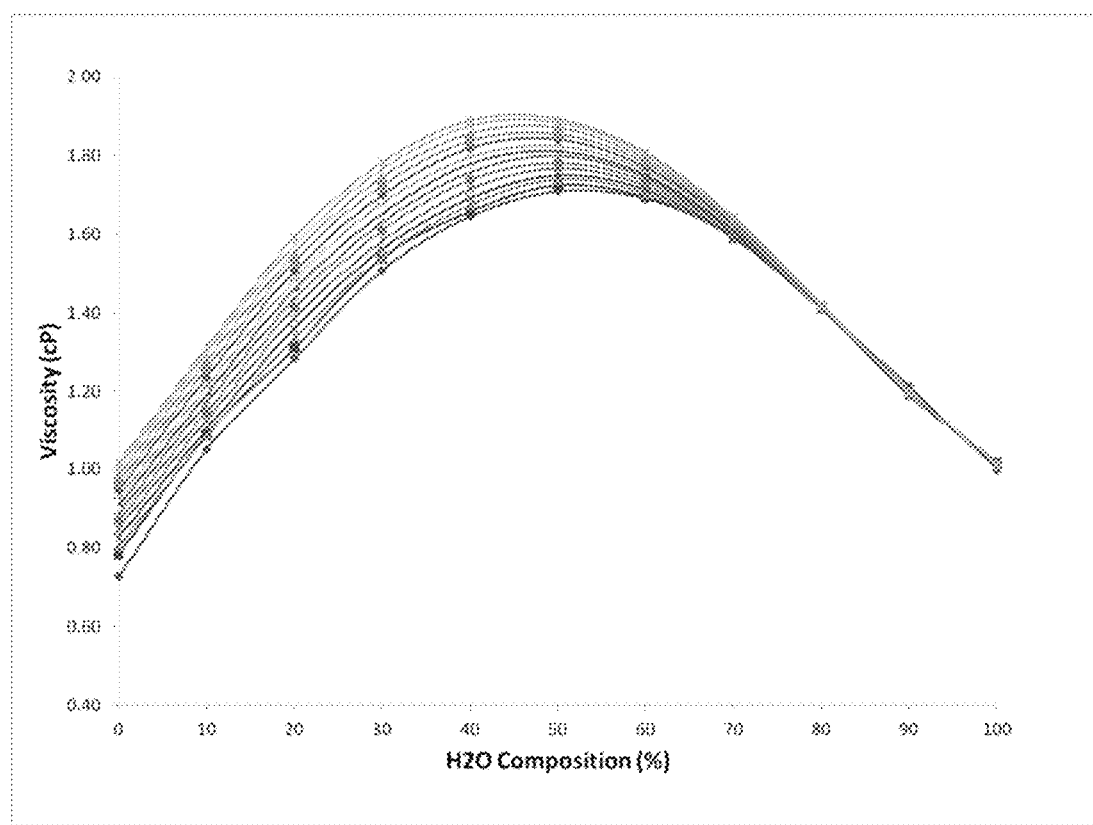
FIG. 5 is a graphical representation of the dependence of viscosity as a function of water content in an aqueous and methanol mixture.

In the examples described above, a linear gradient is used to generate the pressure trace. In an alternative implementation of the method, the linear gradient is replaced with a step change in the solvent mixture composition. In other words, the solvent mixture composition abruptly changes from one value to a different value. The two compositions preferably correspond to the linear region of the viscosity as a function of composition (FIGS. 4 and 5). The resulting pressure trace includes a transition between maximum and minimum values that is more rapid; however, the principles associated with the measured time delay and adjustment for column volume remain the same.

In another alternative implementation of the method, the programmed gradient may be intentionally selected to be a nonlinear gradient. The nonlinear gradient may be defined to compensate for the nonlinearity in a viscosity change so that the pressure trace may have improved linearity. Thus, this intentional "distortion" in the linearity of the gradient composition change enables operation over a wider range of viscosity values, providing a linear pressure response and enabling easy determination of offset between the programmed gradient and measured pressure trace for dwell volume estimation.

Although the examples above are described for liquid chromatography systems in which the solvents are mixed under lower (e.g., atmospheric) pressure, in other implementations of the method a liquid chromatography system having a separate pump for each solvent (high-pressure gradient generation) may be used. In such implementations, the solvent delivered from the outlet of each pump is provided to a respective inlet of a mixer which then provides the high-pressure solvent mixture to the injector valve and chromatographic column. The flow rates of the pumps are controlled in time to maintain a constant solvent mixture flow rate having a changing solvent composition. The system pressure is measured at a location at or downstream from the outlet of the mixer and the calculations of gradient delay and dwell volume are performed as described above for the low pressure mixing examples.

Figure 11:
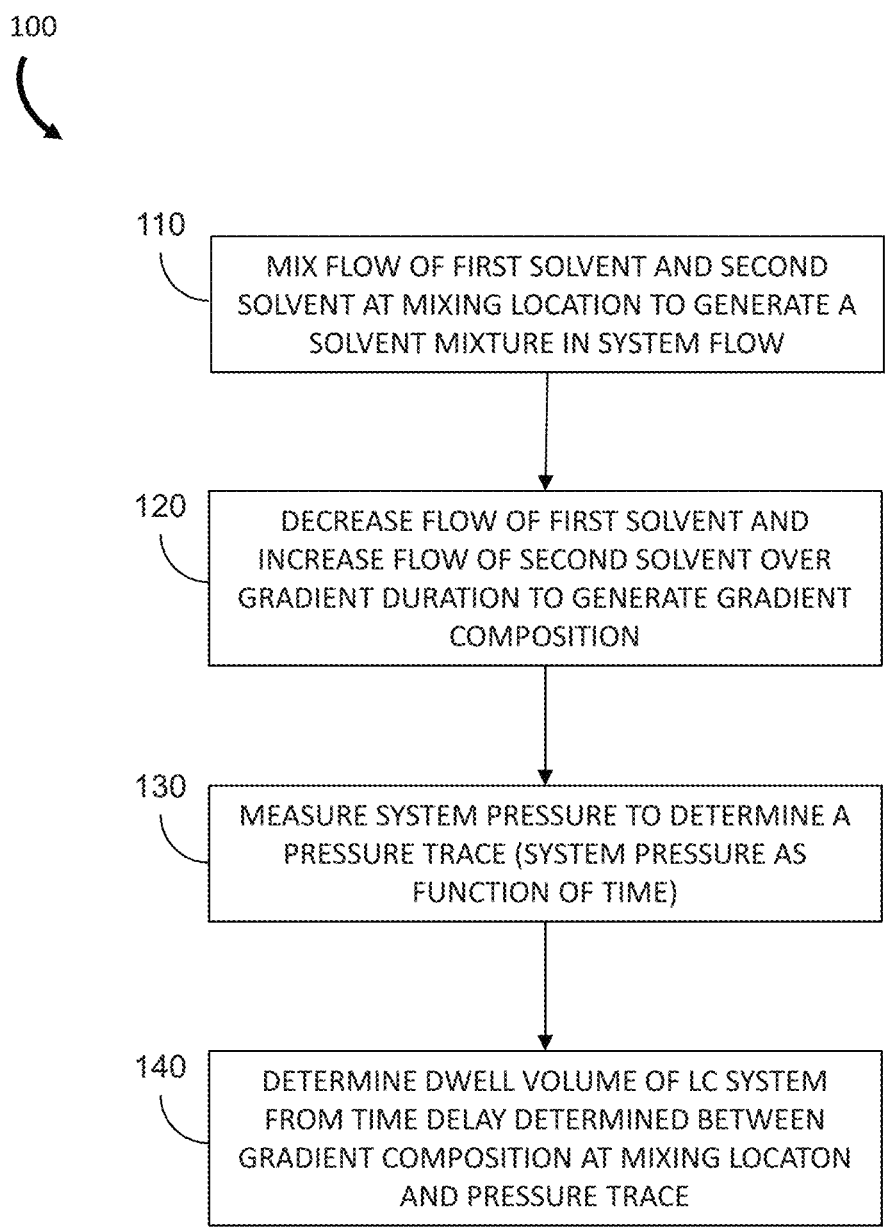
FIG. 11 is a flowchart representation of an example of a method for determining a dwell volume of a liquid chromatography system.

FIG. 11 is a flowchart representation of a generalized example of a method 100 for determining a dwell volume of a liquid chromatography system. The method 100 includes mixing (110) a flow of a first solvent and a flow of a second solvent at a mixing location (e.g., GPV) to generate a solvent mixture in a system flow. The flow of the first solvent is decreased and the flow of the second solvent is increased (120) over the duration of the gradient to generate a gradient composition for the solvent mixture. In some implementations, the gradient composition is a linear gradient although, in alternative implementations, the gradient is nonlinear or a step gradient. The system pressure of the liquid chromatography system is measured (130) to determine a pressure trace which is defined as the measured system pressure as a function of time. In some implementations, the system pressure is measured at the output of a system pump. In alternative implementations, the system pressure may be measured at a different location upstream from the chromatography column or from a system flow restrictor if no chromatography column is present. Subsequent to the determination of the pressure trace, a dwell volume of the liquid chromatography system is determined (140) from a time delay between the gradient composition at the mixing location and the pressure trace.

The method 100 can be performed in an automated way and, if a chromatographic column is in the system flow, the method takes into account the column volume. In some implementations, the column volume is calculated using predetermined information (e.g., column dimensions, particle size, etc.) for the column. For example, a lookup table may store the predetermined information for a number of columns. The column volume for a particular column is then determined by retrieving the stored information in the lookup table that is associated with the column being used and using the retrieved information to calculate the column volume. Alternatively, a lookup table may store previously determined values of column volume for different column types and the column volume for the column in use may be directly determine by retrieval from the lookup table.

The method, and variations thereof, may be in the form of a software implementation (including firmware, resident software, micro-code, etc.) or implemented as a combination of software and hardware aspects. Furthermore, the method may be implemented in the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination thereof.

Computer program code for carrying out operations for aspects of the method may be written in any combination of one or more programming languages, including an object-oriented programming language and conventional procedural programming languages. The program code may execute entirely on the user's computer, partly on the user's computer, as a stand-alone software package, partly on the user's computer and partly on a remote computer or entirely on the remote computer or server. For the latter, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts of the various described methods. For example, the computer program instructions may be provided to the system processor 14 of FIG. 1. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts of the method. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts.

In the examples described above of a method of determining a dwell volume of a liquid chromatography system, various advantages are realized. No additional compound, such as a UV tracer, is utilized, thereby reducing the preparation time for the operator and eliminating the risk of cross-contamination by the compound for later separations. In addition, the liquid chromatography system requires no physical reconfiguration. For example, the method can be performed without the need to remove the chromatographic column and replumb the flow path with additional tubing. Advantageously, the method allows for an efficient determination of the dwell volume of a chromatographic system that reduces operator interaction and therefore reduces the possibility of human error. In addition, the time required for the method and the resulting accuracy can reduce the difficulties encountered when transferring a method between different chromatography systems and configurations.

While the invention has been shown and described with reference to specific embodiments, it should be understood by those skilled in the art that various changes in form and detail may be made therein without departing from the scope of the invention as recited in the accompanying claims.

What is claimed is:

1. A method for determining a dwell volume of a liquid chromatography system, comprising: mixing a flow of a first solvent and a flow of a second solvent at a mixing location to generate a solvent mixture in a system flow of a liquid chromatography system; decreasing the flow of the first solvent and increasing the flow of the second solvent over a gradient duration to generate a gradient composition for the solvent mixture; measuring a system pressure of the liquid chromatography system to determine a pressure trace defined as the measured system pressure as a function of time; and determining a dwell volume of the liquid chromatography system from a product of a known flow rate and a time delay determined between the gradient composition at the mixing location and the pressure trace and from a known volume of a chromatographic column in the liquid chromatography system.

2. The method of claim 1 wherein the solvent mixture has a viscosity and wherein the viscosity changes in response to the gradient composition.

3. The method of claim 2 wherein the change in viscosity is substantially linearly proportional to a change in the solvent mixture according to the gradient composition.

4. The method of claim 1 wherein a viscosity of the first solvent is different than a viscosity of the second solvent.

5. The method of claim 1 wherein the gradient composition is a linear gradient composition.

6. The method of claim 1 wherein the gradient composition is a step gradient.

7. The method of claim 1 wherein the determining of the dwell volume comprises:
    determining a product of the time delay and a flow rate of the solvent mixture; and
    subtracting half of the volume of the chromatographic column from the product.

8. The method of claim 1 wherein the liquid chromatography system includes a flow restrictor configured to provide a system pressure drop for the system flow and wherein the determining of the dwell volume comprises determining a product of the time delay and a flow rate of the solvent mixture.

9. The method of claim 1 wherein the gradient composition is a nonlinear gradient composition determined to provide a substantially linear pressure change for at least a portion of the pressure trace responsive to the gradient composition.

10. A computer program product for determining a dwell volume of a liquid chromatography system, the computer program product comprising: a non-transitory computer readable storage medium having computer readable program code embodied therewith, the computer readable program code comprising: computer readable program code configured to mix a first solvent and a second solvent at a mixing location to generate a solvent mixture in a system flow of a liquid chromatography system; computer readable program code configured to decrease the flow of the first solvent and increase the flow of the second solvent over a gradient duration to generate a gradient composition for the solvent mixture; computer readable program code configured to measure a system pressure and determine a pressure trace therefrom, the pressure trace defined as the measured system pressure as a function of time; and computer readable program code configured to determine a dwell volume of the liquid chromatography system from a product of a known flow rate and a time delay between the gradient composition at the mixing location and the pressure trace and from a known volume of a chromatographic column in the liquid chromatography system.

11. The computer program product of claim 10 wherein the computer readable program code configured to determine a dwell volume comprises:
   computer readable program code configured to determine a product of the time delay and a flow rate of the solvent mixture; and
   computer readable program code configured to subtract half of the volume of the chromatographic column from the product.

12. A liquid chromatography system comprising; a source of a first solvent and a source of a second solvent; a mixer having a mixer inlet to receive the first and second solvents and a mixer outlet to provide a solvent mixture; a pump having a pump inlet in fluidic communication with the mixer outlet and having a pump outlet, the pump receiving the solvent mixture at the pump inlet and providing the solvent mixture at a system pressure in a system flow dispensed from the pump outlet; a flow restrictor having a restrictor inlet in fluidic communication with the pump outlet and having a restrictor outlet; a pressure sensor disposed in a system flow after the pump outlet and generating a pressure signal indicating a measured system pressure; and a processor in communication with the sources of the first and second solvents and with the pressure sensor, the processor configured to: generate a gradient composition in the system flow by controlling a contribution of the first solvent and a contribution of the second solvent to the mixer; determine a pressure trace from the pressure signal, the pressure trace defined as the measured system pressure as a function of time; determine a time delay between the gradient composition at the mixing location and the pressure trace; and determine a dwell volume of the liquid chromatography system from a product of a known flow rate and the time delay.

13. The liquid chromatography system of claim 12 further comprising a gradient proportioning valve disposed between the mixer and the sources of the first and second solvents.

14. The liquid chromatography system of claim 12 wherein the processor determines the dwell volume as a product of the time delay and a flow rate of the solvent mixture.

15. The liquid chromatography system of claim 12 wherein the flow restrictor is a chromatographic column and wherein the determining of the dwell volume comprises:
   determining a product of the time delay and a flow rate of the solvent mixture; and
   subtracting half of a volume of the chromatographic column from the product.

16. A liquid chromatography system comprising: a source of a first solvent and a source of a second solvent; a first pump having a first pump inlet in fluidic communication with the source of the first solvent and having a first pump outlet; a second pump having a second pump inlet in fluidic communication with the source of the second solvent and having a second pump outlet; a mixer having a first mixer inlet and a second mixer inlet in fluidic communication with the first pump outlet and the second pump outlet, respectively, the mixer having a mixer outlet to provide a solvent mixture; a flow restrictor having a restrictor inlet in fluidic communication with the pump outlet and having a restrictor outlet; a pressure sensor disposed in a system flow after the mixer outlet and generating a pressure signal indicating a measured system pressure; and a processor in communication with the first and second pumps and the pressure sensor, the processor configured to: generate a gradient composition in the system flow by controlling a contribution of the first solvent and a contribution of the second solvent to the mixer; determine a pressure trace from the pressure signal, the pressure trace defined as the measured system pressure as a function of time; determine a time delay between the gradient composition at the mixing location and the pressure trace; and determine a dwell volume of the liquid chromatography system from a product of a known flow rate and the time delay.

17. The liquid chromatography system of claim 16 wherein the processor determines the dwell volume as a product of the time delay and a flow rate of the solvent mixture.

18. The liquid chromatography system of claim 16 wherein the flow restrictor is a chromatographic column and wherein the determining of the dwell volume comprises:
   determining a product of the time delay and a flow rate of the solvent mixture; and
   subtracting half of a volume of the chromatographic column from the product.

* * * * *